No. 727,073. PATENTED MAY 5, 1903.
J. T. BRAYTON.
SIGHT FOR FIREARMS.
APPLICATION FILED JUNE 26, 1902.
NO MODEL.
*Fig: 1.*
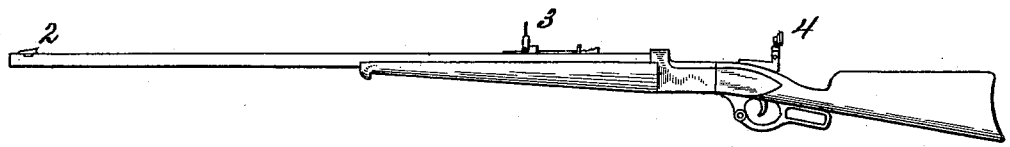
*Fig: 2.*
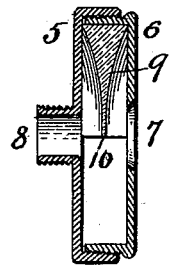
*Fig: 3.*
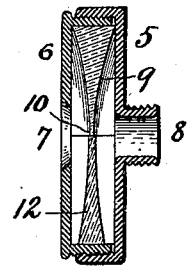
*Fig: 4.*
Witnesses:
J. B. McGinn
Wm Henderson
Inventor
James T. Brayton
By H. A. West
attorney No. 727,073. Patented May 5, 1903.

UNITED STATES PATENT OFFICE.

JAMES T. BRAYTON, OF CHICAGO, ILLINOIS.

SIGHT FOR FIREARMS.

SPECIFICATION forming part of Letters Patent No. 727,073, dated May 5, 1903.

Application filed June 26, 1902. Serial No. 113,234. (No model.)

*To all whom it may concern:*

Be it known that I, JAMES T. BRAYTON, a citizen of the United States, and a resident of Chicago, in the county of Cook and State of Illinois, have invented certain new and useful Improvements in Sights for Firearms, of which the following is a specification.

My invention relates to lens-sights for firearms; and it consists, mainly, in a double-vision sight—that is, a sight having such construction that in aiming the arm a double or bifocal image is impressed upon the retina of the eye. Various arrangements of the lenses may be employed to meet the requirements of defective vision. For the normal eye only the magnifying and one other lens need be used, the latter terminating at or nearly at the axis of the line of vision in aiming, so that a restricted magnifying-field for distance is afforded, another portion being open. In other arrangements appropriate lenses will be employed, each terminating at or near the axis of the line of vision in aiming, one to magnify the target, the other for correcting the vision as to the muzzle-sight.

In the accompanying drawings, to which reference is made, and which forms a part of this specification, Figure 1 is a side elevation of a rifle having one arrangement of my new and improved sight applied thereto, the lens-sight being at the breech. Fig. 2 is an enlarged sectional elevation of the lens-sight having one lens. Fig. 3 is a like view showing the lens-sight provided with two lenses, and Fig. 4 is an enlarged side elevation of the magnifying-lens.

In the arrangement shown in Fig. 1, 2 designates the front sight; 3, the center sight, which is provided with a double-convex, plano-convex, or other magnifying-lens, and 4 designates the rear sight, preferably of the peep order. This latter sight, as here shown, is mounted at the breech of the gun and by preference is adapted to be tilted forward or back in the usual manner. The same is true of the sight 3. The sight 4 is by preference composed of two shells 5 6, screwed together and formed with the peep-orifices 7 8. As shown in Fig. 2, the sight is provided with a lens 9, the edge 10 of which terminates at or near the diameter of the peep-openings, leaving a portion of the peep open. In the form shown in Fig. 3 an additional lens 12 is employed, the edge of which meets or approximately coincides with the edge 10 of the lens 9. The lens 9 is a double-concave, plano-concave, periscopic concave, or other diminishing-lens. The lens 12 is a diminishing-lens of the same order as the lens 9, of appropriate power, and calculated to correct any error of refraction, muscular weakness, or other defect of vision.

By aiming below or out of the field covered by the lens 9 the front or muzzle sight is magnified by the lens-sight 3 and the target is obscured or rendered indistinct; but by shifting the eye slightly to the lens 9 the target is magnified and made clear and distinct and the front sight rendered indistinct, but not invisible, a double image of front sight and target is impressed upon the eye, and great accuracy of aim may be obtained.

With the arrangement shown in Fig. 2 for defective eyesight, as from near or far sightedness or other defect, the lens 12 of proper power for the particular individual serves to render distinct the front sight in the preliminary aim before drawing upon the target.

I do not limit myself to any special construction of means for holding the lenses or to lenses of any special power, as these may be variously modified all within the scope of my invention.

Having thus described my invention, what I claim as new, and desire to secure by Letters Patent, is—

1. The combination with a magnifying-lens sight mounted on the barrel of the gun, of a rear sight mounted at the breech of the gun and a diminishing-lens held in said rear sight whose edge terminates at or near the aiming-line of said sights, substantially as described.

2. The combination with a magnifying-lens sight mounted on the barrel of the gun of a rear sight mounted at the breech of the gun and a diminishing-lens held in said rear sight the area of said last-mentioned lens being less than the area of vision afforded by aiming through the said rear sight, substantially as described.

3. A peep-sight for firearms comprising means for holding a lens and have a minute peep-orifice therein and a diminishing-lens held in said sight so as to cover only a p tion of said orifice thus affording both open and lens vision in aiming, substantially as described.

4. A peep-sight for firearms comprising means for holding lenses and having a minute peep-orifice therein, a diminishing-lens held in said sight so as to cover only a portion of said orifice, and another lens held in said sight so as to cover another portion of said peep-orifice the last-named lens being of different power than the first-named lens, substantially as described.

JAMES T. BRAYTON.

Witnesses:
SIDNEY H. ISRAEL,
JOHN FRIEDLANDER.